H. W. DEWEY.
FEED HOPPER.
APPLICATION FILED DEC. 24, 1910.
1,028,445.
Patented June 4, 1912.
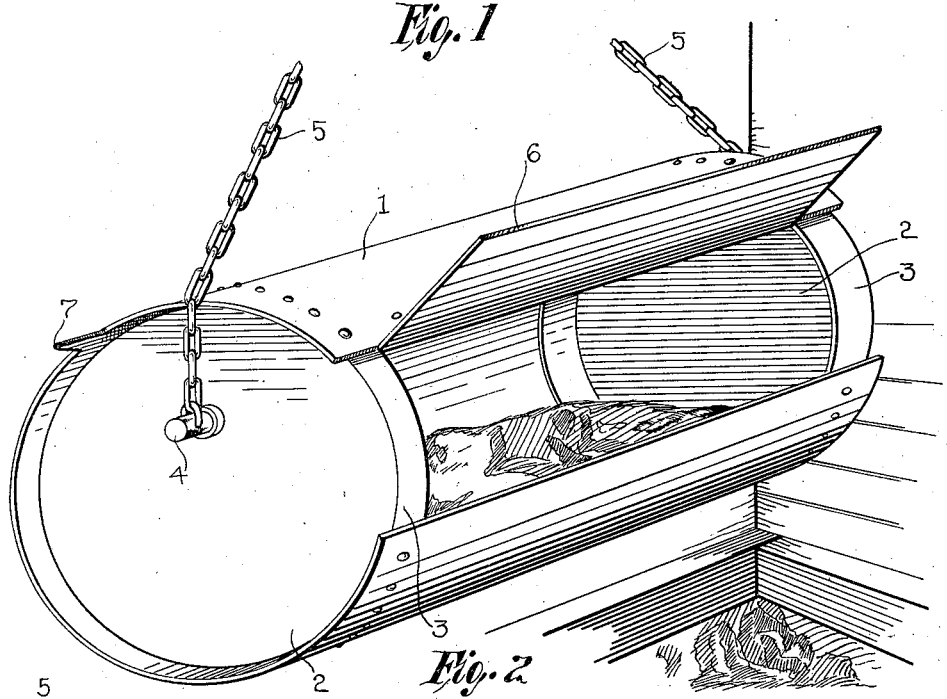
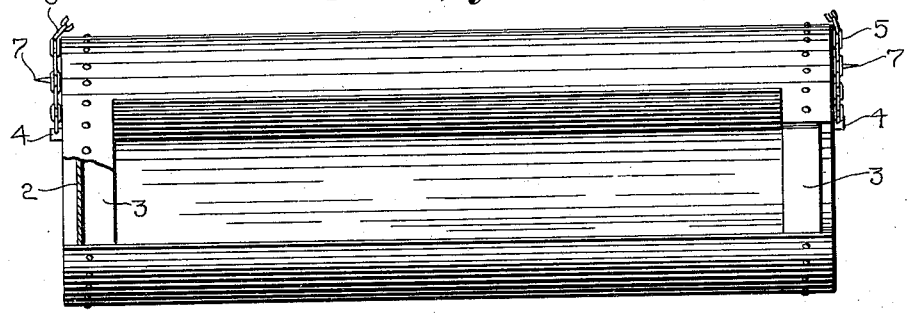
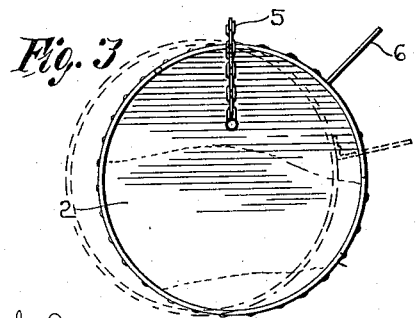
Inventor
H. W. Dewey

UNITED STATES PATENT OFFICE.

HARPER W. DEWEY, OF SIDNEY CENTER, NEW YORK.

FEED-HOPPER.

1,028,445.  Specification of Letters Patent. Patented June 4, 1912.

Application filed December 24, 1910. Serial No. 599,103.

*To all whom it may concern:*

Be it known that I, HARPER W. DEWEY, a citizen of the United States, residing at Sidney Center, in the county of Delaware, in the State of New York, have invented certain new and useful Improvements in Feed-Hoppers, of which the following is a specification, reference being had therein to the accompanying drawing.

This invention relates to receptacles for feeding or watering poultry.

The invention has for its object to provide a receptacle for feeding or watering poultry by means of which the feed will not be wasted and dirt and other matter will be prevented from getting into the receptacle.

The invention further has for its object to provide a receptacle for feeding and watering fowls which can be adjusted as the contents diminish so as to bring the latter within reach of the poultry.

The invention further has for its object to provide a receptacle for feeding or watering fowls by means of which the poultry can not get into the receptacle or roost on top of the same.

Referring to the accompanying drawings: Figure 1 is a view in perspective of a receptacle for feeding or watering fowls constructed in accordance with this invention, and suspended within a building. Fig. 2 is a front view of the receptacle. Fig. 3 is an end view thereof.

The receptacle preferably in the form of a cylinder as here shown consists of a cylindrical sheet of metal 1 the end edges of which sheet are spaced apart from each other so as to form a longitudinal opening in the side of the receptacle for access of poultry to the feed or water. The receptacle is formed with disk-shaped ends or heads 2 each having a flange 3 to which is riveted the cylindrical sheet of metal 1. Each of the heads 2 of the receptacle is provided with a pin 4 above the center thereof to which is connected the end of a chain 5, the chains 5 being connected at their other ends to a suitable support, not shown, for suspending the receptacle at such a height from the floor that the poultry cannot get into the receptacle but have access from the opening in the side for feeding purposes. The upper edge of the opening in the side is preferably formed with an inclined shield 6 which prevents the entrance of dirt and other matter into the receptacle. When the feed has become diminished in the receptacle, the latter may be rotated so as to bring the opening lower down toward the floor or ground. The receptacle is provided with a projection 7 over which the chain 5 may be passed, thereby holding the receptacle in its rotated position when the mouth of the receptacle has been brought down nearer to the floor or ground. By forming the receptacle in the shape of a cylinder, poultry cannot roost on the same as they will slide off.

By means of the construction of the device hereinbefore described, it is convenient to fill, easy to clean, and presents perfect protection against waste or pollution of its contents. It may be used to either contain food or water.

What I claim is:

A device of the character described comprising a cylindrical rotatable casing made of a single sheet of material, said casing being provided on one of its sides with a longitudinal opening, an upwardly inclined shield formed on the upper edge of said opening and integral with said casing, a longitudinally extending projection formed upon either end of said casing and adjacent the top thereof, end-closures riveted to said casing, pivot pins mounted upon said end-closures above the center thereof, and suspending chains secured to said pins and adapted to engage the ends of said casing and said projections when the cylinder is rotated.

In testimony whereof I hereunto affix my signature in presence of two witnesses.

HARPER W. DEWEY.

Witnesses:
 G. E. HALLEY,
 C. W. SAGENDORF.

Copies of this patent may be obtained for five cents each, by addressing the "Commissioner of Patents, Washington, D. C."